United States Patent
Brennan, Jr.

(10) Patent No.: US 6,377,609 B1
(45) Date of Patent: Apr. 23, 2002

(54) SPREAD SPECTRUM FREQUENCY HOPPING SYSTEM AND METHOD

(75) Inventor: William J. Brennan, Jr., Montgomery, AL (US)

(73) Assignee: Neptune Technology Group Inc., Tallassee, AL (US)

( * ) Notice: Subject to any disclaimer, the term of this patent is extended or adjusted under 35 U.S.C. 154(b) by 0 days.

(21) Appl. No.: 09/263,900

(22) Filed: Mar. 5, 1999

(51) Int. Cl.[7] .................................................. H04L 27/30
(52) U.S. Cl. ........................................ 375/133; 375/141
(58) Field of Search .................................. 375/130, 133, 375/132, 141, 135, 136, 138, 295, 316; 370/320, 342, 441, 479, 294, 336, 337, 343, 344, 345, 347, 442, 480; 455/509, 31.1, 134, 132, 133, 135, 150, 179.1

(56) References Cited

U.S. PATENT DOCUMENTS

| 5,166,953 | A | | 11/1992 | Hershey et al. | |
|---|---|---|---|---|---|
| 5,287,384 | A | * | 2/1994 | Avery et al. | 375/202 |
| 5,339,331 | A | | 8/1994 | Beauchamp et al. | |
| 5,377,222 | A | | 12/1994 | Sanderford, Jr. | |
| 5,386,435 | A | | 1/1995 | Cooper et al. | |
| 5,408,496 | A | | 4/1995 | Ritz et al. | |
| 5,430,759 | A | | 7/1995 | Yokev et al. | |
| 5,499,266 | A | | 3/1996 | Yokev et al. | |
| 5,546,422 | A | | 8/1996 | Yokev et al. | |
| 5,583,517 | A | | 12/1996 | Yokev et al. | |
| 5,619,493 | A | | 4/1997 | Ritz et al. | |
| 5,625,641 | A | | 4/1997 | Takakusaki | |
| 5,737,327 | A | * | 4/1998 | Ling et al. | 370/335 |
| 5,793,795 | A | | 8/1998 | Li | |
| 5,859,879 | A | * | 1/1999 | Bolgiano et al. | 375/347 |
| 5,875,179 | A | * | 2/1999 | Tikalsky | 370/315 |
| 5,930,288 | A | * | 7/1999 | Eberhardt | 375/200 |
| 5,991,331 | A | * | 11/1999 | Chennakeshu et al. | 375/202 |
| 5,999,561 | A | * | 12/1999 | Naden et al. | 375/206 |
| 6,023,615 | A | * | 2/2000 | Bruckert et al. | 455/277.2 |
| 6,058,137 | A | | 5/2000 | Partyka | |
| 6,188,715 | B1 | * | 2/2001 | Partyka | 375/134 |
| 6,208,632 | B1 | * | 3/2001 | Kowalski et al. | 370/335 |
| 6,298,054 | B1 | * | 10/2001 | Dorenbosch et al. | 370/350 |

* cited by examiner

Primary Examiner—Chi Pham
Assistant Examiner—Emmanuel Bayard
(74) Attorney, Agent, or Firm—Dority & Manning

(57) ABSTRACT

A frequency hopping spread spectrum wireless transmission system includes a transmitter and a receiver system. The transmitter is configured to transmit radio frequency data signals in sequential time periods on respective transmit channels according to a pre-determined sequence. The data signal in each time period includes information relating the data signal to its position within the pre-determined sequence. The receiver system is configured to monitor a plurality of receive channels over a frequency range that includes the transmit channels and to receive the data signals on the receive channels. The receiver system is also configured to determine, upon reception of a first data signal on a first receive channel, a next receive channel based on the first receive channel so that the next receive channel differs from the first receive channel an amount equal to the interval between the data signal's position and the next position in the sequence, and to monitor the next receive channel for a next data signal.

31 Claims, 6 Drawing Sheets

| RECEIVER | | | TRANSMITTER | |
|---|---|---|---|---|
| CHANNEL | FREQUENCY (MHz) | | FREQUENCY (MHz) | CHANNEL |
| a1 | 908.66 | | | |
| a2 | 909.00 | | | |
| a3 | 909.33 | | | |
| b1 | 909.66 | | | |
| b2 | 910.00 | | 910.00 | b |
| b3 | 910.33 | | | |
| c1 | 910.66 | | | |
| c2 | 911.00 | | 911.00 | c |
| c3 | 911.33 | | | |
| d1 | 911.66 | | | |
| d2 | 912.00 | | 912.00 | d |
| d3 | 912.33 | | | |
| e1 | 912.66 | | | |
| e2 | 913.00 | | 913.00 | e |
| e3 | 913.33 | | | |
| f1 | 913.66 | | | |
| f2 | 914.00 | | 914.00 | f |
| f3 | 914.33 | | | |
| g1 | 914.66 | | | |
| g2 | 915.00 | | | |
| g3 | 915.33 | | | |

BW: 66KHz (receiver); 33KHz (transmitter)

*FIG. 7*

SPREAD SPECTRUM FREQUENCY HOPPING SYSTEM AND METHOD

BACKGROUND OF THE INVENTION

The present invention relates to wireless transmission systems. More particularly, the invention relates to improved frequency hopping spread spectrum systems.

Spread spectrum transmission techniques are commonly used in wireless systems. Generally, such systems employ "direct sequence" or "frequency hopping" methods. In frequency hopping systems, both the transmitter and receiver operate on frequencies that change over sequential time periods according to a predetermined hop sequence. Once the receiver begins to receive transmitted data, the receiver and the transmitter independently follow the hop sequence. For example, assume that a transmitter transmits in 100 millisecond periods at each hop frequency and that the receiver monitors all frequencies within the transmitter's operative frequency range. As the transmitter moves from frequency to frequency, the receiver tunes to those frequencies in step with the transmitter to receive the entire message. The message may be short enough, however, to require only one period.

Initially, the receiver scans or otherwise monitors the transmitter's frequency range looking for a transmitted signal. Upon detecting a signal, the receiver determines the signal's position in the hop sequence and synchronizes to the transmitter. Various techniques for identifying the hop sequence position should be familiar to those skilled in this art and are therefore not discussed in detail herein. Briefly, however, where the transmitter transmits at any given channel only once during the sequence, the frequency value identifies the sequence position. Thus, the receiver might determine the hop sequence position simply by identifying the channel on which the signal was transmitted.

The receiver must synchronize itself to the transmitter so that the receiver and transmitter "hop" at the same time. If the receiver detects the initial transmission midway through the dwell period, it must therefore find the period's end to hop to the next frequency in time for the next transmission. It may identify the period's end simply by the end of the transmission. If the receiver then moves to the next hop frequency, it is thereafter synchronized with the transmitter. Those skilled in this art should be familiar with synchronizing techniques, which are therefore not discussed in detail herein.

Since the receiver knows all the transmission frequencies in the sequence and the order in which they are used, it is then able to monitor each subsequent frequency in the sequence to receive subsequent data signals until the message is complete. Such a system requires, however, that the transmitter and receiver be relatively accurate. If the transmitter drifts, such that the frequency upon which a given data signal is actually transmitted is offset from the intended frequency, the receiver may not be able to adequately receive it. The problem commonly occurs when the drift occurs at most or all transmission frequencies throughout the hop sequence. A similar problem exists when the receiver drifts and is compounded when both devices drift.

SUMMARY OF THE INVENTION

The present invention recognizes and addresses the foregoing disadvantages, and others, of prior art constructions and methods.

Accordingly, it is an object of the present invention to provide an improved frequency hopping spread spectrum wireless transmission system.

More particularly, it is an object of the present invention to provide such a system that is able to compensate for frequency drift in the transmitter and/or the receiver.

Some of these objects are achieved by a frequency hopping spread spectrum wireless transmission system having a transmitter and a receiver system. The transmitter is configured to transmit radio frequency data signals in sequential time periods on respective transmit channels according to a predetermined channel sequence. The data signal in each time period includes information relating the data signal to its position within the predetermined sequence. The receiver system is configured to monitor a plurality of receive channels over a frequency range that includes the transmit channels and to receive the data signals on the receive channels. The receiver system is also configured to determine, upon reception of a first data signal on a first receive channel, a next receive channel based on the first receive channel so that the next receive channel differs from the first receive channel an amount equal to the interval between the data signal's position and the next position in the sequence, and to monitor the next receive channel for a next data signal.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings in which:

FIG. 7 is a tabular illustration of receive and transmit channel designations for use in an embodiment of a system according to the present invention.

Figure 1:
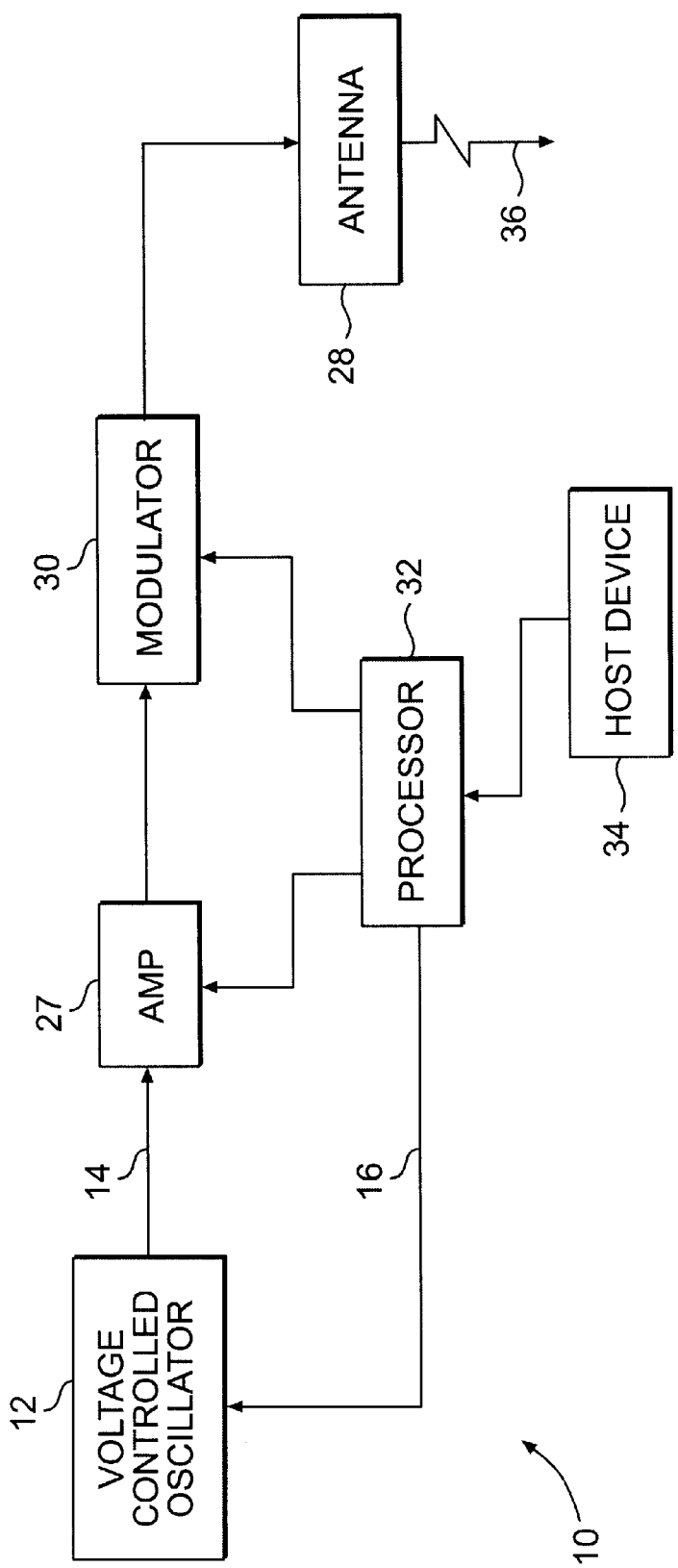
FIG. 1 is a schematic block diagram illustration of a transmitter for use in a wireless transmission system according to an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention is directed to frequency hopping spread spectrum transmission systems. Two transmitter arrangements which may be used with the present invention are respectively illustrated in FIGS. 1 and 6. The transmitters are provided for purposes of example only, and it should be understood by those skilled in this art that various other suitable configurations, such AM and FM, may be employed. Furthermore, the design and construction of transmitters suitable for use in the present invention should be well understood by those skilled in the art and are therefore, for purposes of clarity, illustrated schematically herein.

Figure 6:
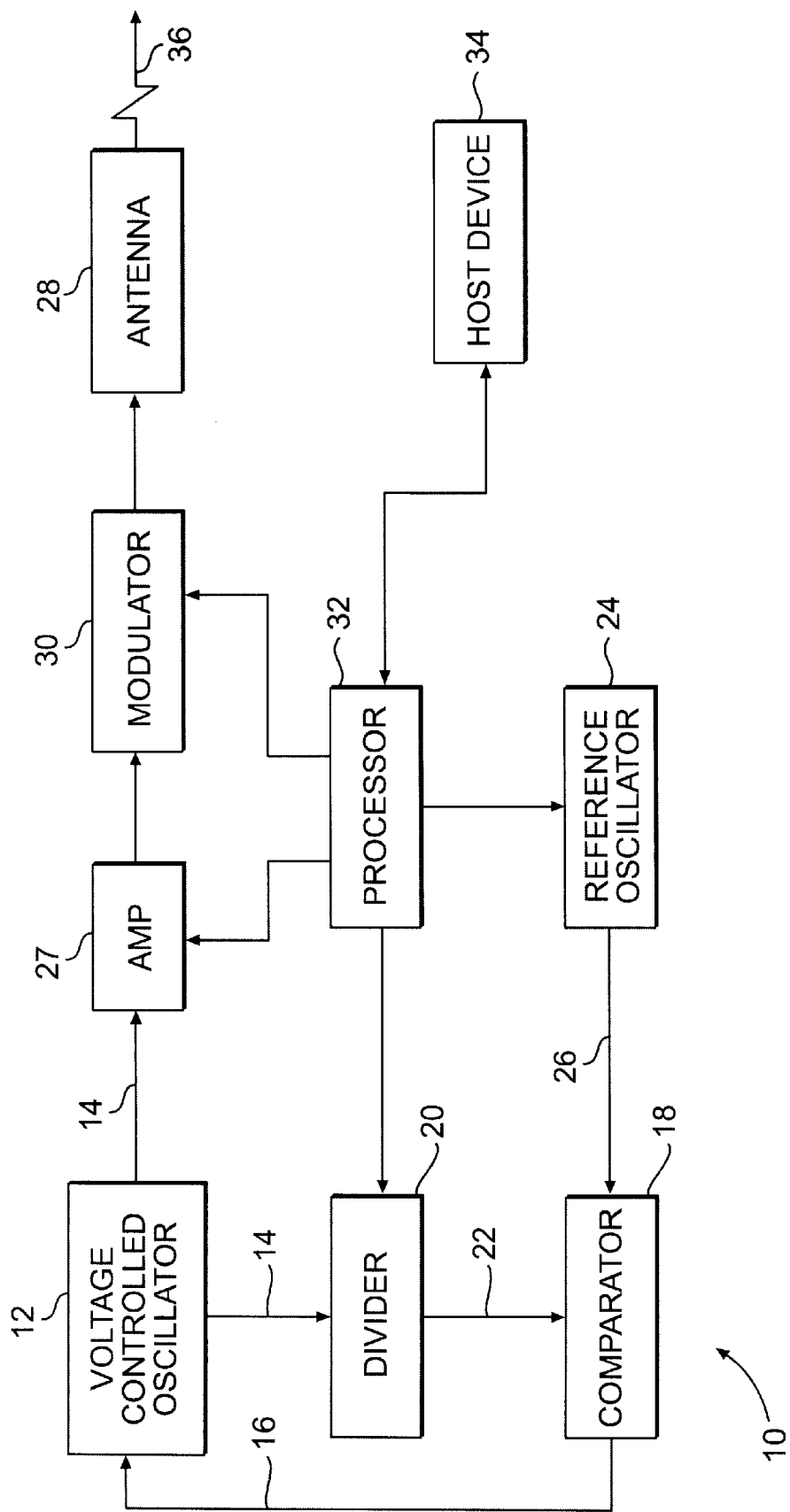
FIG. 6 is a schematic block diagram illustration of a receiver for use in a wireless transmission system according to an embodiment of the present invention.

Referring to FIG. 6, a transmitter 10 includes a voltage controlled oscillator 12 outputting a signal 14 that oscillates at a frequency determined by a voltage input signal 16 provided by a comparator control circuit 18. Comparator control circuit 18 controls voltage input signal 16 to maintain the frequency of signal 14 at a desired level. For example, suppose that oscillator 12 is configured to output signal 14 at 900 MHZ. A divider circuit 20 steps signal 14 down to a 90 MHZ signal 22 output to comparator circuit 18. A reference oscillator 24 provides a 90 MHZ signal 26 to comparator circuit 18. If the frequency of signal 22 remains equal to the frequency of signal 26, within predefined limits, the carrier signal 14 output by oscillator 12 is at the desired frequency, and comparator circuit 18 maintains voltage signal 16. If, however, the frequency of signal 14 varies such that the frequency of signal 22 differs from that of signal 26, comparator circuit 18 adjusts the voltage of signal 16 until the frequencies of signals 22 and 26 again agree.

Oscillator 12 also outputs signal 14 to an amplifier 27 that amplifies the carrier signal to a level sufficient to drive an antenna 28. A modulator circuit 30 is controlled by a microprocessor 32 and modulates the carrier signal from amplifier 27. A host device 34, for example a computer system, communicates with transmitter 10 through processor 32. Thus, host device 34 inputs information to microprocessor 32 which, in turn, modulates carrier signal 14 so that data signals 36 transmitted by antenna 28 carry desired information.

Because the frequency of carrier signal 14 is controlled by divider 20, host device 34 controls the frequency of data signals 36 by controlling the frequency of signal 26 through microprocessor 32 and divider 20. Thus, host device 34 is programmed to control microprocessor 32 so that transmitter 10 outputs a data signal 36 at a first frequency for a certain period of time and then switches to a second frequency for that same period of time. The system continues to "hop" from frequency to frequency until the desired message is completely transmitted.

The period at which the transmitter transmits at a given frequency is referred to as the dwell period. The frequencies through which the transmitter hops are determined by the hop sequence. The sequence may be defined in various suitable manners. In one configuration, the host device and transmitter may be programmed to sequentially transmit on a series of predefined channels stored in the transmitter processor's memory. For example: start at 910 MHZ, move to 900 MHZ, move to 925 MHZ, etc. In another configuration, however, the system may be programed to transmit the first data signal on a predefined first frequency and then move to subsequent frequencies according to predefined frequency intervals. For example: start at 910 MHZ, move down 10 MHZ, move up 25 MHZ, etc. The second example may be modified so that the starting point is randomly chosen within a predefined frequency band. Thus, the transmitter transmits data signals in sequential time periods on "respective" frequency channels in that the transmission in a given time period is made at a frequency determined by the hop sequence, even though the hop sequence may be defined in any suitable manner such as described above.

The number of time periods/channels depends on the amount of data transmitted. For example, where all the data can be transmitted in one data signal, only one time period/channel is needed.

The transmitter shown in FIG. 6 may be referred to as a closed loop, or phase-locked loop, AM transmitter due to the feedback control loop. To reduce cost in some systems, however, it may be preferred to employ an open loop transmitter as schematically illustrated in FIG. 1. Voltage controlled oscillator 12 again generates a carrier signal 14 amplified by amplifier 27. The frequency at which oscillator 12 should generate signal 14 is set by a voltage control signal 16 output by microprocessor 32. Processor 32 controls modulator circuit 30 so that transmitter 10 outputs desired data signals 36 from antenna 28.

Due to various factors such as age and ambient conditions, the actual transmitted channel may drift from the frequency at which oscillator 12 is configured to output in response to a given control signal 16. With no feedback loop, processor 32 is unaware of the actual frequency of carrier signal 14 and does not compensate for drift. As described in more detail below, however, the present system is configured to accommodate drift in the transmitter and/or receiver.

Figure 2:
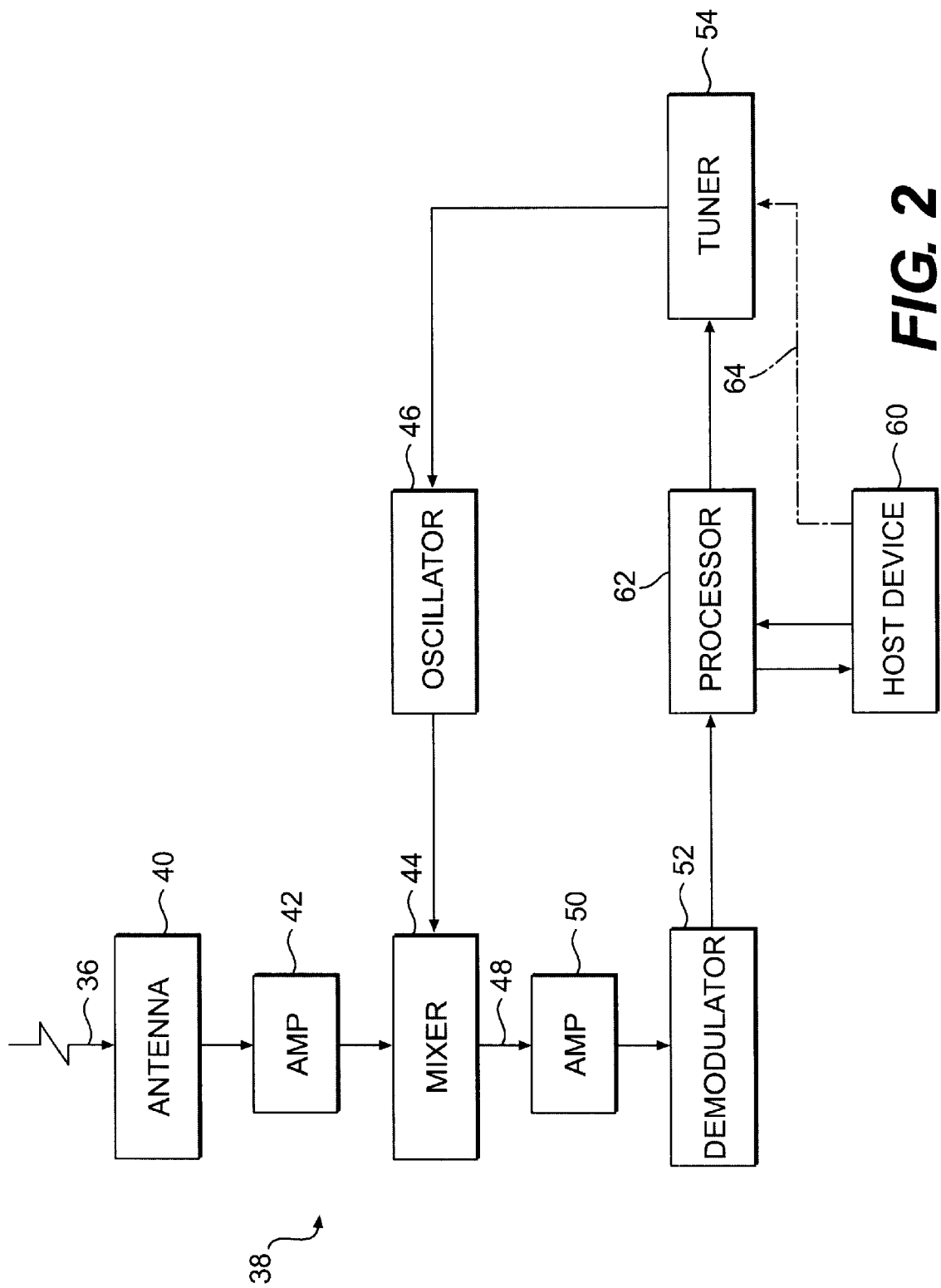
FIG. 2 is a schematic block diagram illustration of a receiver for use in a wireless transmission system according to an embodiment of the present invention.

Referring to FIG. 2, a receiver 38 includes an antenna 40 to receive signal 36 from transmitter 10 (FIGS. 1, 2). Antenna 40 outputs to an RF amplifier 42 that, in turn, outputs to a mixer 44. Receiver 38 is a superheterodyne receiver, and mixer 44 combines the modulated and amplified input signal from amplifier 42 with the output signal from a local RF oscillator 46 to output a modulated intermediate frequency signal 48. An amplifier 50 amplifies this signal for decoding by a demodulator circuit 52. The tuner circuit controls oscillator 46 so that signal 48 is output from mixer 44 at the desired intermediate frequency. Tuner 54 represents circuitry used in conjunction with oscillator 46 to adjust those components to such desired frequencies. It should be understood, however, that such circuitry could be represented by the oscillator block in FIG. 2. It should also be understood that the tuner may be configured to tune only to predefined channels or to continuously scan the receiver's operative frequency band so that the receive channel is defined wherever a signal is received within that band.

Figure 3:
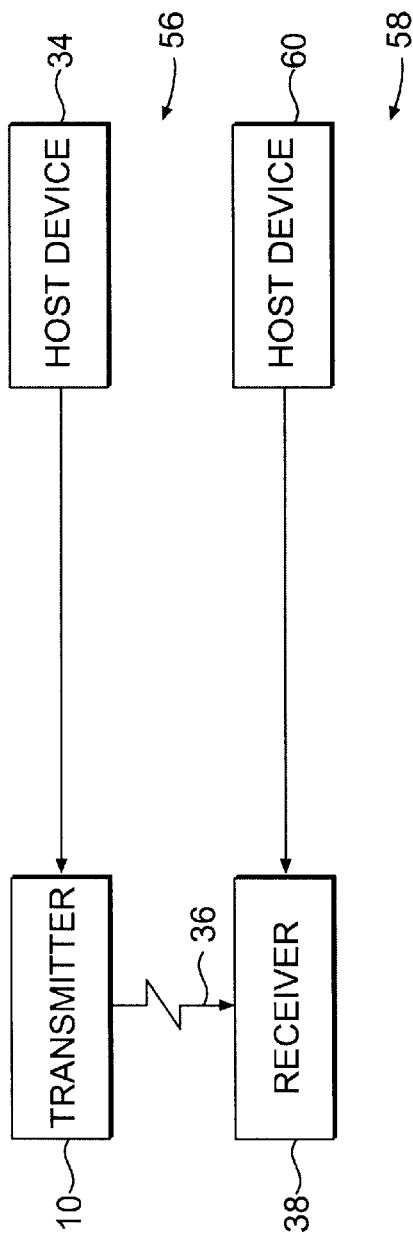
FIG. 3 is a schematic block diagram illustration of a transmission system according to an embodiment of the present invention.

Referring also to FIG. 3, one preferred embodiment of a transmission system 56 includes a transmitter 10 transmitting signals 36 that are received by a receiver system 58 comprising a single receiver 38 communicating with a single host device 60. Host device 60 may comprise any suitable communication system, for example including a computer, and communicates with receiver 38 to receive demodulated data from demodulator circuit 52.

Prior to receiving a transmitted message, processor 62 sequentially changes the frequencies of oscillator 46 and amplifier 42 so that receiver 38 sequentially scans frequency channels over a frequency range including at least the channels on which transmitter 10 transmits. As noted above, the scan may be incremental or continuous. That is, the receiver may jump from one to another receive channels separated by some predetermined frequency increment or may continuously move through the frequency band. In the first case, the receiver sequentially scans a set of predetermined channels, while in the second it sequentially scans an infinite number of channels (since there are an infinite number of points between any two points) within the band. Upon detecting a data signal 36, the microprocessor controls the receiver to monitor appropriate channels according to the hop sequence until the message carried by data signals 36 is completed. Methods which may be employed within the present invention to define the receive channels in the hop sequence are discussed in more detail below.

Figure 4:
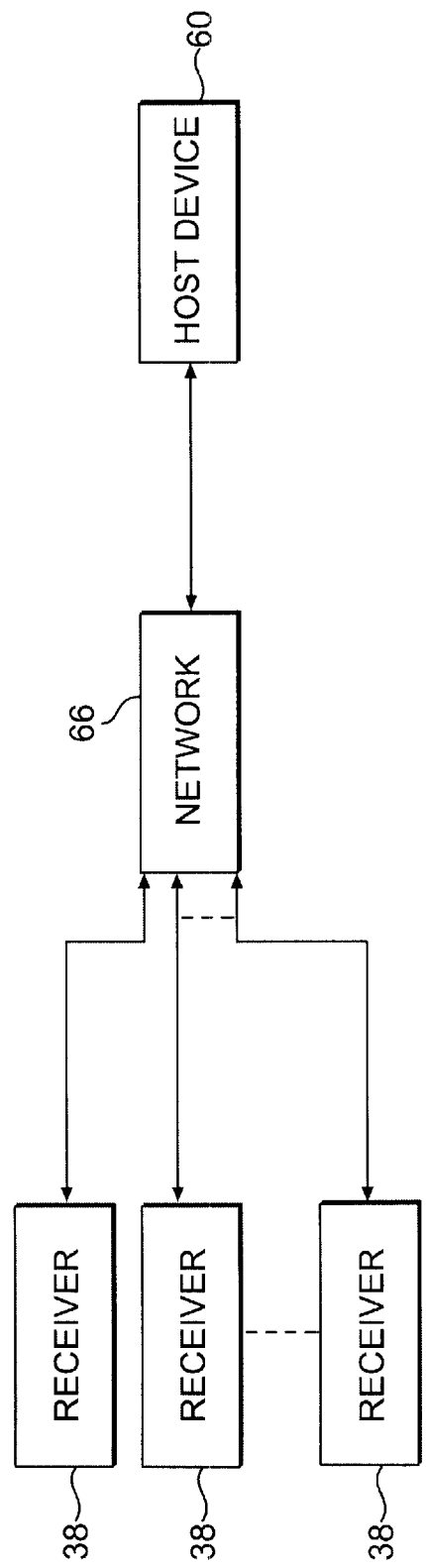
FIG. 4 is a schematic block diagram illustration of a receiver system for use in a wireless transmission system according to an embodiment of the present invention.

In a further embodiment, host device 60 controls receiver 38 to follow the hop sequence. The host device may control the receiver through microprocessor 62 or, as indicated by phantom arrow 64, directly through tuner circuit 54. In another preferred embodiment as shown in FIG. 4, host device 60 communicates with a plurality of receivers 38 through a network configuration 66. Each receiver 38 is tuned to a particular channel within which data signals are expected to be received. The host device sequentially monitors the receivers through network configuration 66 until a data signal is received. The host device then monitors subsequent receivers according to the hop sequence, as described in more detail below, until the message is received.

The transmitter is configured to transmit on a plurality of transmit channels within a given frequency range. It may be configured to tune to predetermined channels or to tune within a continuous band. The receiver system is configured to receive data signals from the transmitter over a plurality of receive channels within at least the transmitter's frequency range. One exemplary receive and transmit channel schedule in which both the transmit channels and the frequency channels are predefined is shown in FIG. 7. Here, the transmitter is configured to transmit on any of five channels b through f having frequencies of 910, 911, 912, 913 and 914 MHZ, respectively. The receiver is configured to receive on any of 21 predefined receive channels a1 through g3 at 0.33 MHZ intervals beginning at 908.66 MHZ.

In the FIG. 7 embodiment, there are more receive channels than transmit channels, and the receive channels extend above and below the range of transmit channels. Further, the bandwidth of each receive channel is larger than the bandwidth of each transmit channel. In the illustrated example, the bandwidth of each transmit channel is approximately 33 MHZ whereas the bandwidth of each receive channel is approximately 66 MHZ. Each receive channel overlaps with each of its adjacent receive channels by approximately 33 MHZ. It should be understood, however, that while less preferred, the receiver frequency range and receive channel bandwidth could be less than the transmit frequency range and transmitter channel bandwidth, respectively.

As is discussed in more detail below, the extension of the receive channels above and below the transmit channels in preferred embodiments increases the probability that, if the transmit channels drift, the receiver system will receive all the transmitted signals. The receive channel overlap increases the probability that at least one receive channel adequately receives a given data signal. Thus, such overlap is preferably enough, within the constraints of a given system, to reasonably assure that at least one receive channel receives the entire transmitted signal where the signal is transmitted within the range of receive channels. For example, as shown in FIG. 7, the receive channel overlap is equal to or greater than each transmit channel's bandwidth.

Figure 5:
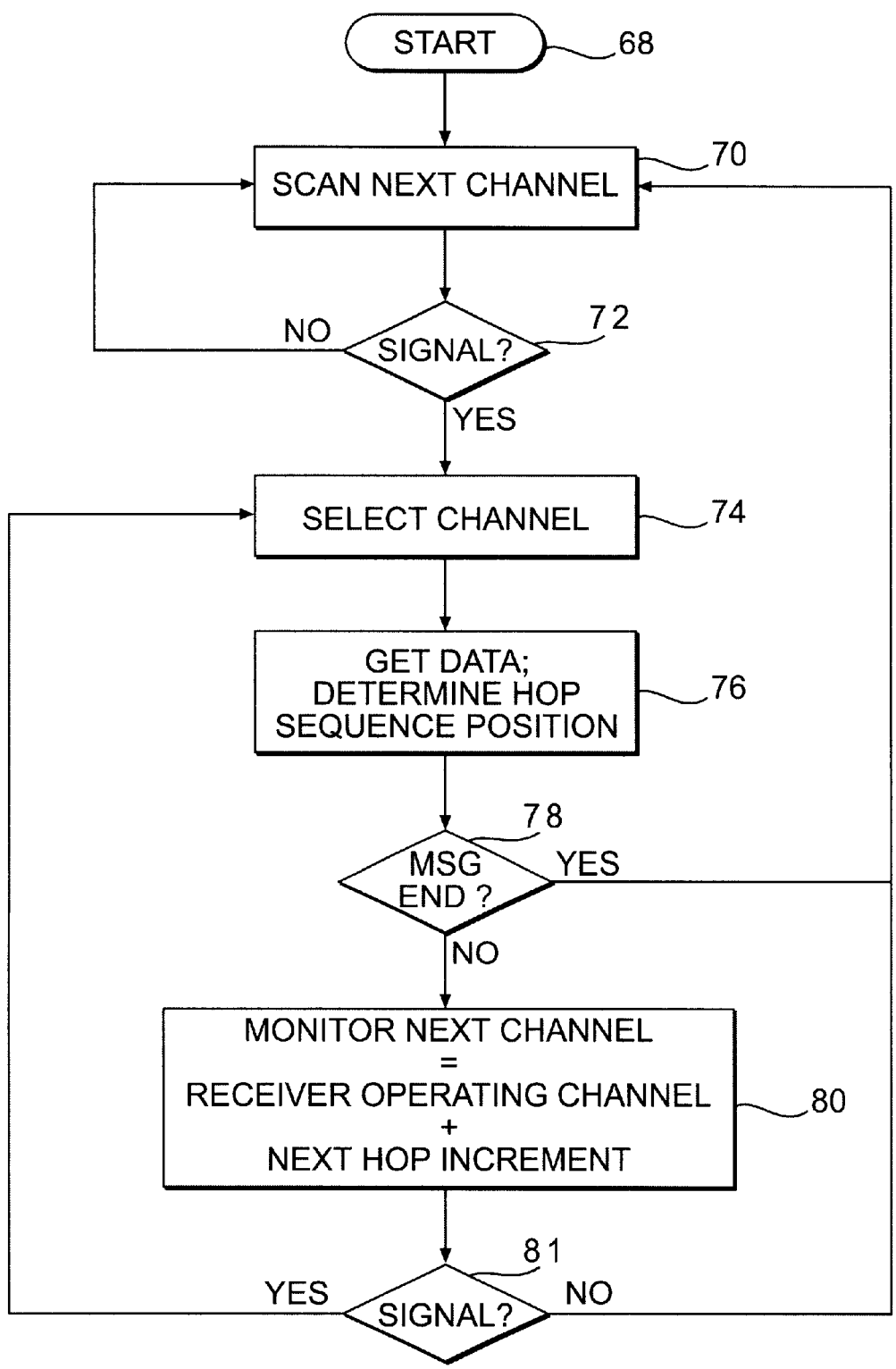
FIG. 5 is a flow diagram of an embodiment of a wireless transmission method according to the present invention.

Operation of a transmission system according to the present invention will now be described with reference to the operational flow chart provided in FIG. 5 and to the transmitter and receiver configurations as shown in FIGS. 1, 2 and 7. Following the system's start up at 68, microprocessor 62 of receiver 38 changes the frequency of oscillator 46, for example incrementally, so that the receiver repeatedly scans through receive channels a1 through g3 at 70. At each receive channel, microprocessor 62 checks the output of demodulator circuit 52 at 72. If no data signal is detected, the receiver moves to the next channel at 70. If a data signal is detected, the receiver selects the appropriate channel at 74 upon which to receive the data signal.

Since the receive channels overlap, the data signal is often readable on adjacent channels. Accordingly, when a data signal is detected on a given receive channel, the receiver monitors the adjacent predetermined channels above and below the detected channel and selects the channel upon which the data signal is most strongly received. In an embodiment where the receive channels are not predefined and where the receiver continuously scans the receive frequency band, the receiver may move up and down a predetermined frequency increment. If the signal is received equally well on different channels, the receiver defaults, for example, to the first of the two monitored channels. Thus, assuming receiver 38 sequentially monitors the receive channels from channels a1 through g3 and detects a data signal at channel c3, the receiver checks channels c2 and d1. If the data signal is most strongly detected at channel d1, the receiver selects channel d1 at 74 as the receive channel for that data signal.

Once the receiver operating channel is selected at 74, the microprocessor retrieves the data from signal 36 from demodulator circuit 52 and determines the hop sequence position for that signal. The data signal in each time period carries information "relating" the data signal to its position in the transmitter channel hop sequence. This can be achieved in any suitable manner, depending on the information known by the transmitter and receiver system. For example, where the transmitter is programmed to transmit data in the hop sequence on pre-defined channels, and where the receiver system knows the pre-defined transmitter channels and the sequence order, the signal may simply identify its intended transmit channel. Since the receiver system knows the sequence position of each transmit channel, this information is sufficient to identify the current sequence position.

The data signal might identify the next intended channel in the sequence instead of the present channel. This also identifies the present intended channel where the receiver knows the sequence position of each transmit channel and the nature of its data signal's information. The data signal may also include a character identifying the intended receiver system so that the receiver system can ignore other transmissions in the area.

Where the data signal simply identifies its sequence position (e.g. first second, third, etc.), the receiver system need only know the hop sequence frequency intervals, not necessarily any pre-defined transmit channels. This arrangement may be used where the transmit channels are not pre-defined, for example where the transmitter is programmed to randomly choose an initial channel and thereafter proceed according to the hop sequence.

Further, the data signal may carry information identifying the frequency interval to the next intended transmit channel. Since each data signal therefore tells the receiver where to hop next to receive the next data signal, the receiver system in this arrangement does not necessarily need to know either the hop sequence or any pre-defined transmit channels.

Thus, regardless of the form of the "relating" information carried by the data signal, the receiver system determines the next frequency to monitor based on the actual receive channel upon which the previous data signal was received, rather than by following a pre-defined schedule of receive channels. That is, the receiver system effectively defines the receive channel schedule responsively to the channels on which it determines data has actually been sent. The receiver is therefore unaffected by transmitter drift, provided the transmitter does not drift beyond the receiver's operative frequency range. The receive channel schedule may be defined within a set of predefined channels or among an infinite number of channels within the continuous receiver frequency band, depending on the operation of the receiver as described above.

The system may define the receive channel schedule once, for example at an initial data reception, or continuously at each data reception. Although several examples are provided below, it should be understood that such are provided for illustrative purposes only and that all suitable methods and configurations of the present invention are included within the scope and spirit thereof. Further, the receiver may pick up a signal in the middle of a transmission.

Once the data from signal 36 is retrieved, and the hop sequence position is determined, at 76, the microprocessor determines whether the message is completed at 78. In a preferred embodiment, the data signal includes an end code at the end of the message. If the microprocessor detects this code, the receiver returns to scanning step 70.

If there is no end code at 78, the microprocessor moves to the next channel in the hop sequence at 80. Again, the manner in which the next frequency is defined may depend upon the information known to the transmitter and receiver system and upon the relating information carried by the data signal. For example, assume that when beginning transmission of a new message, the transmitter randomly chooses the first transmit frequency b, c, d, e or f but thereafter hops according to a repeating, pre-defined hop sequence, for example b-d-c-e-f. The data signal in turn carries information identifying the channel b, c, d, e or f upon which the transmitter is attempting to transmit the data signal. That is, the data signal identifies the frequency at which oscillator 12 should output carrier signal 14 as set by microprocessor 32 if the transmitter accurately operates.

In this example, the receiver knows the predefined channels b through f in the transmitter's hop sequence. Therefore, if the receiver detects a data signal on receive channel a3 (909.33 MHZ), and the data signal identifies the intended transmit channel as transmit channel b (910 MHZ), the receiver determines that the relationship between the receiver and transmitter is off by approximately 66 kHz. The offset may be caused by transmitter drift, as described above, and/or receiver drift. Receiver drift may be caused by inaccuracies in receiver components so that the receiver sees the data signal on, for example, receive channel a3 when it is actually received on receive channel b2. Regardless of the cause of the offset, the receiver accounts for it in moving to the next receive channel for the next data signal. In this case, the receiver knows that the next transmit channel in the hop sequence is transmit channel d but that the receiver and transmitter are offset by 66 kHz. Thus, to receive the next data signal, the microprocessor adjusts the frequencies of the receiver's RF amplifier and oscillator so that the receiver is tuned to receive channel c3 for the next data signal.

The receiver need not know the transmit channel hop sequence if the data signal provides adequate information. For example, if the data signal identifies the next frequency interval in the hop sequence, for example positive 20 MHz for the interval from transmit channel b to transmit channel d, the receiver need only receive the current data signal and move the appropriate frequency interval to receive the next signal. Since the receiver follows the transmitter, any drift by either device is irrelevant as long as the receiver's frequency range includes the transmitter's drift. Thus, the manner in which the data signal relates the signal's position in the hop sequence may vary in any suitable fashion.

If the data packet is the end of the message to be transmitted, or if the message is so short that only one data signal is required, the data signal may contain suitable information to identify itself as the final signal, as noted above. The end-of-data may be denoted by omission of a transmit channel identifier.

Once the receiver moves to the next receive channel at 80, it checks at 81 to determine whether a signal is present at that channel. If for some reason, for example where the transmitter is deactivated during the middle of a transmission, no signal is detected, the receiver resumes its scan of the receive channels. If a data signal is detected, the receiver returns to the select channel step 74 as described above. This step allows the receiver to accommodate inconsistent transmitter drift. Provided the drift is not extreme, the receiver identifies the shift at step 74, and the receiver has a new reference point from which to determine where the next hop will be.

As noted above, the receiver system may be configured with multiple receivers as shown in FIG. 4. Here, the host device 60 may operate as described above with respect to a single receiver—sequentially scanning receivers 38 at step 70, selecting the appropriate receiver at the appropriate receive channel, and monitoring the subsequent receiver at the channel determined at 80. Alternatively, however, the host device may simply scan the receiver array. Since the host device can effectively simultaneously receive data on all channels, it retrieves and reads and/or stores each data signal as it is received from the transmitter. The data signals may be stored in the order they are received or according to information carried by the data signal relating each data signal's position in the hop sequence. Because the receiver's receive channels preferably cover a larger frequency range than the transmitter's transmit channels, and because the receive channels preferably abut or overlap each other, the transmit and receive channels may drift while still effectively conveying the data signals.

In a still further embodiment of the present invention, the receiver system may comprise any suitable configuration, for example those illustrated in FIGS. 3 and 4. Again, the receive channels preferably cover a broader frequency range than do the transmit channels, and the receive channels preferably define operative bandwidths such that each receive channel throughout the receive channel frequency range at least abuts its two adjacent receive channels. Preferably, each receive channel overlaps each of its adjacent receive channels by an amount, for example at least equal to the bandwidth of each transmit channel, sufficient to assure that each transmit channel is received.

The transmitter transmits messages in data signals according to a pre-determined hop sequence. Each data signal prior to the final signal includes an end character that indicates to the receiver's microprocessor, or the host device, that a data signal is ending and that a subsequent data signal will be transmitted. Upon detecting this character, the receiver or host device resumes scanning the receive channels until detecting the next data signal. The data signal preferably begins with a character identifying the signal as a data signal that should be received. This introductory character may be peculiar to an individual receiver or host device so that the receiver or host device ignores nearby data signals intended for a different device. Under these conditions, the receiver again need not know the transmitter's hop sequence. Because the receive channels extend over a larger frequency range than the transmit channels, and because the receive channels abut or overlap each other, the system can accommodate transmitter and/or receiver drift.

While one or more preferred embodiments of the invention have been described above, it should be understood that any and all equivalent realizations of the present invention are including within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the literal or equivalent scope of the appended claims.

What is claimed:

1. A frequency hopping spread spectrum wireless transmission system, said system comprising:

a transmitter configured to transmit radio frequency data signals in sequential time periods on respective transmit channels according to a predetermined channel sequence, said data signal in each said time period including information relating said data signal to its position within said predetermined sequence; and a receiver system configured to monitor a plurality of receive channels over a frequency range that includes said transmit channels and to receive said data signals on said receive channels, wherein said receiver system is programmed with said predetermined sequence and is also configured to determine, upon reception of a first said data signal on a first said receive channel, a next said receive channel based on said first receive channel so that said next receive channel differs from said first receive channel an amount equal to the interval between said position and the next position in said sequence, and to monitor said next receive channel for a next data signal.

2. The transmission system as in claim 1, wherein said transmit channels are predetermined.

3. The transmission system as in claim 2, wherein said information includes said transmit channel corresponding to said position.

4. The transmission system as in claim 2, wherein said information includes said transmit channel corresponding to said next position.

5. The transmission system as in claim 3, wherein said receiver system is configured to determine the difference between said corresponding transmit channel and said first receive channel and to offset said transmit channel corresponding to said next position by said difference to thereby determine said next receive channel.

6. The transmission system as in claim 1, wherein said information includes said interval.

7. The transmission system as in claim 6, wherein said receiver system is configured to offset said first receive channel by said interval to thereby determine said next receive channel.

8. The transmission system as in claim 1, wherein said information includes said position.

9. The transmission system as in claim 1, wherein said receiver system includes a single receiver.

10. The transmission system as in claim 1, wherein said receiver system is configured, upon detection of a said data signal on an initial said receive channel, to monitor for said data signal on at least one higher and at least one lower said receive channels and to select one of said initial receive channel, said at least one higher receive channel and said at least one lower receive channel upon which said data signal is most strongly received as said first receive channel.

11. The transmission system as in claim 10, wherein said receiver system is configured to select said initial receive channel as said first receive channel when said initial receive channel and one of said at least one higher receive channel and said at least one lower receive frequency equally and most strongly receives said data signal.

12. The transmission system as in claim 1, wherein said transmitter comprises an open loop radio frequency transmitter.

13. The transmission system as in claim 1, wherein each said receive channel defines an operative bandwidth such that said receive channels operatively cover the entirety of said receiver system frequency range and wherein said operative bandwidth is greater than the operative bandwidth of any said transmit channel.

14. The transmission system as in claim 13, wherein each said receive channel overlaps each said adjacent receive channel.

15. The transmission system as in claim 14, wherein each said receive channel overlaps each said adjacent receive channel an amount at least equal to the bandwidth of any said transmit channel.

16. A frequency hopping spread spectrum wireless transmission method, said method comprising:

(a) transmitting radio frequency data signals in sequential time periods on respective transmit channels according to a predetermined channel sequence, said data signal in each said time period including information relating said data signal to its position within said predetermined sequence;

(b) monitoring a plurality of receive channels over a frequency range that includes said transmit channels;

(c) receiving a first said data signal on a first said receive channel;

(d) determining a next said receive channel based on said first receive channel so that said next receive channel differs from said first receive channel an amount equal to the interval between said position and the next position in said sequence; and (e) monitoring said next receive channel for a next said data signal; and (f) repeating steps (c), (d), and (e) until transmission of said data signals in said transmitting step ends, wherein said first data signal and said first receive channel of each subsequent step (c) is said next data signal and said next receive channel, respectively, of the preceding step (e).

17. The method as in claim 16, wherein said transmit channels are predetermined.

18. The method as in claim 17, wherein said information includes said transmit channel corresponding to said position.

19. The method as in claim 17, wherein said information includes said transmit channel corresponding to said next position.

20. The method as in claim 18, wherein said determining step includes determining the difference between said corresponding transmit channel and said first receive channel and offsetting said transmit channel corresponding to said next position by said difference to thereby determine said next receive channel.

21. The method as in claim 16, wherein said information includes said interval.

22. The method as in claim 21, wherein said determining step includes offsetting said first receive channel by said interval to thereby determine said next receive channel.

23. The method as in claim 16, wherein said information includes said position.

24. The method as in claim 16, wherein said receiving step includes detecting said first data signal on an initial said receive channel, monitoring for said first data signal on at least one higher and at least one lower said receive channels and selecting one of said initial receive channel, said at least one higher receive channel and said at least one lower receive channel upon which said first data signal is most strongly received as said first receive channel.

25. The method as in claim 24, wherein said receiving step includes selecting said initial receive channel as said first receive channel when said initial receive channel and one of said at least one higher receive channel and said at least one lower receive channel equally and most strongly receives said first data signal.

26. A frequency hopping spread spectrum wireless transmission method, said method comprising the steps of:

(a) transmitting radio frequency data signals in sequential time periods on respective transmit channels according to a predetermined channel sequence, said data signal in each said time period including information relating said data signal to its position within said predetermined sequence;

(b) monitoring a plurality of receive channels over a frequency range that includes said transmit channels;

(c) detecting a first said data signal on an initial said receive channel;

(d) monitoring for said first data signal on a higher receive channel and a lower said receive channel;

(e) selecting one of said initial receive channel, said higher receive channel and said lower receive channel on which said first data signal is most strongly received as a first receive channel;

(f) receiving said first data signal on said first receive channel;

(g) determining a next said receive channel based on said first receive channel so that said next receive channel differs from said first receive channel an amount equal to the interval between said position and the next position in said sequence;

(h) monitoring said next receive channel for a next said data signal; and (i) repeating steps (c), (d), (e), (f), (g) and (h) until transmission of said data signals in said transmitting step ends, wherein said first data signal and said initial receive channel of each subsequent step (c) is said next data signal and said next receive channel, respectively, of the preceding step (h).

27. A frequency hopping spread spectrum wireless transmission system, said system comprising:

means for transmitting radio frequency data signals in sequential time periods on respective transmit channels according to a predetermined channel sequence, said data signal in each said time period including information relating said data signal to its position within said predetermined sequence; and means for monitoring a plurality of receive channels over a frequency range that includes said transmit channels, for receiving said data signals on said receive channels, for determining, upon reception of a first data signal on a first said receive channel, a next said receive channel based on said first receive channel so that said next receive channel differs from said first receive channel an amount equal to the interval between said position and the next position in said sequence, and for monitoring said next said receive channel for a next said data signal, wherein said monitoring means is programmed with said predetermined sequence.

28. A frequency hopping spread spectrum wireless transmission system, said system comprising:

a transmitter configured to transmit radio frequency data signals in sequential time periods on respective transmit channels according to a predetermined channel sequence; and a receiver system configured to monitor a plurality of receive channels over a frequency range greater than and including said transmit channels and to receive said data signals on said receive channels, wherein each said data signal in each said time period includes information relating said data signal to its position within said predetermined channel sequence, each said receive channel defines an operative bandwidth such that said receive channels operatively cover the entirety of said receiver system frequency range, wherein said operative bandwidth is greater than the operative bandwidth of any said transmit channel and wherein a next said receive channel is based on a first said receive channel so that said next receive channel differs from said first receive channel an amount equal to the interval between said position in said sequence.

29. The transmission system as in claim 28, wherein the operative frequency band defined within said operative bandwidth of each said receive channel overlaps said operative frequency band of each adjacent said receive channel.

30. The transmission system as in claim 29, wherein each said receive channel overlaps each said adjacent receive channel an amount at least equal to the bandwidth of any said transmit channel.

31. The transmission system as in claim 28, wherein said data signal in each said time period includes an instruction to said receiver system to receive said data signal.

* * * * *